US010726287B2

(12) United States Patent
Kim (10) Patent No.: US 10,726,287 B2
(45) Date of Patent: *Jul. 28, 2020

(54) CAMERA AND OBJECT PROCESSING APPARATUS USING SAME

(71) Applicant: Gachisoft Inc., Daejeon (KR)

(72) Inventor: Hoyon Kim, Sejong (KR)

(73) Assignee: Gachisoft Inc., Daejeon (KR)

( * ) Notice: Subject to any disclaimer, the term of this patent is extended or adjusted under 35 U.S.C. 154(b) by 122 days.

This patent is subject to a terminal disclaimer.

(21) Appl. No.: 15/735,842

(22) PCT Filed: Apr. 12, 2016

(86) PCT No.: PCT/KR2016/003832
§ 371 (c)(1),
(2) Date: Dec. 12, 2017

(87) PCT Pub. No.: WO2016/200039
PCT Pub. Date: Dec. 15, 2016

(65) Prior Publication Data
US 2018/0173987 A1    Jun. 21, 2018

(30) Foreign Application Priority Data
Jun. 12, 2015   (KR) .................. 10-2015-0083638

(51) Int. Cl.
G06K 9/20       (2006.01)
G02B 7/182      (2006.01)
(Continued)

(52) U.S. Cl.
CPC ............. *G06K 9/2036* (2013.01); *G02B 7/08* (2013.01); *G02B 7/182* (2013.01);
(Continued)

(58) Field of Classification Search
None
See application file for complete search history.

(56) References Cited

U.S. PATENT DOCUMENTS 7,248,407 B2   7/2007   Kwon et al.
7,564,492 B2   7/2009   Nagayoshi et al.
(Continued)

FOREIGN PATENT DOCUMENTS

JP   59-144622 U    9/1984
JP   10-318717 A   12/1998
(Continued)

OTHER PUBLICATIONS

International Search Report issued in counterpart International Application No. PCT/KR2016/003832 dated Jul. 18, 2016 (2 pages in English; 3 pages in Korean).
(Continued)

*Primary Examiner* — Kevin Ky
(74) *Attorney, Agent, or Firm* — NSIP Law (57) ABSTRACT

Disclosed are a camera and an object processing apparatus using the same. A camera according to an embodiment of the present invention focuses on moving objects by adjusting the ray distance between a lens and a sensor in a manner whereby a mirror is moved between the lens and the sensor, which are each fixedly installed, or whereby one side end of the sensor is moved, without a mirror.

7 Claims, 10 Drawing Sheets

(51) Int. Cl.
*G03B 3/10* (2006.01)
*G03B 39/00* (2006.01)
*G02B 7/08* (2006.01)
*G02B 26/08* (2006.01)
*G06K 9/62* (2006.01)
*G03B 13/34* (2006.01)
*G06K 7/10* (2006.01)

(52) U.S. Cl.
CPC ........... *G02B 26/0816* (2013.01); *G03B 3/10* (2013.01); *G03B 13/34* (2013.01); *G03B 39/00* (2013.01); *G06K 7/10722* (2013.01); *G06K 9/2027* (2013.01); *G06K 9/6267* (2013.01); *G06K 2209/01* (2013.01)

(56) References Cited

U.S. PATENT DOCUMENTS

| | | |
|---|---|---|
| 7,621,454 B2 | 11/2009 | Itou et al. |
| 2002/0126395 A1 | 9/2002 | Gianchandani et al. |
| 2003/0043261 A1 | 3/2003 | Gianchandani et al. |
| 2003/0053080 A1 | 3/2003 | Gianchandani et al. |
| 2006/0269104 A1* | 11/2006 | Ciolli ........................ G08G 1/04 382/104 |
| 2011/0310289 A1* | 12/2011 | Veksland ................. G02B 7/08 348/345 |
| 2014/0055624 A1* | 2/2014 | Gaines ............... G02B 26/0816 348/207.1 |

FOREIGN PATENT DOCUMENTS

| | | |
|---|---|---|
| JP | 2006-155395 A | 6/2006 |
| JP | 2007-133851 A | 5/2007 |
| JP | 2012-133200 A | 7/2012 |
| KR | 2003-0005235 A | 1/2003 |
| KR | 2004-0097166 A | 11/2004 |
| KR | 10-2005-0005310 A | 1/2005 |
| KR | 10-2013-0054617 A | 5/2013 |

OTHER PUBLICATIONS

Canadian Office Action dated Oct. 15, 2018, in corresponding Canadian Application No. 2,989,287 (5 pages, in English).
Japanese Office Action dated Nov. 27, 2018, in corresponding Japanese Application No. 2018-517106 (3 pages, in Japanese).
Korean Office Action dated Jan. 26, 2018, in corresponding Korean Application No. 10-2015-0083638 (7 pages, in Korean).

* cited by examiner

CAMERA AND OBJECT PROCESSING APPARATUS USING SAME

CROSS REFERENCE TO RELATED APPLICATIONS

This application is a U.S. National Stage Application of International Application No. PCT/KR2016/003832, filed on Apr. 12, 2016, which claims the benefit under 35 USC 119(a) and 365(b) of Korean Patent Application No. 10-2015-0083638, filed on Jun. 12, 2015, in the Korean Intellectual Property Office.

TECHNICAL FIELD

The present invention relates to a camera technology for photographing a quickly moving object.

BACKGROUND ART

Line scan cameras or area scan cameras are used to photograph moving objects. For example, to photograph a moving object on a moving base such as a conveyer belt, the line scan camera or the area scan camera acquires image by emitting light toward the object and detects light reflected from the object.

Image acquisition technologies using the line scan cameras or the area scan cameras may be applied to logistics, factory automation (FA), and test process automation according to uses, and may have various application fields such as recognition of a position, a size, a shape, an identification mark, and a text, a defect test, and the like However, the line scan camera or the area scan camera needs a highspeed focus control capability to acquire a high quality image even when an object rapidly moves.

DISCLOSURE

Technical Problem

The present invention is directed to providing a camera capable of corresponding to a speed of a rapidly moving object and simply automatically adjusting a focus to acquire an image of the object, and an object processing apparatus using the same

Technical Solution

One aspect of the present invention provides a camera including a lens configured to collect and transmit light received from a moving object, a mirror configured to reflect the light transmitted from the lens, and a sensor configured to receive the light reflected from the mirror and convert the light into an image signal, wherein an optical distance between the lens and the sensor, which are fixedly installed, is adjusted by the mirror, which is installed to be movable, being moved between the lens and the sensor, and a focus is adjusted.

When objects having different heights or volumes are photographed, the mirror may be moved to increase or decrease the optical distance between the lens and the sensor to adjust a focus onto the object according to a distance between the object and the camera.

The mirror may include one side end fixed by a mirror shaft, and the other side end of the mirror is connected to a motor, and the other side of the mirror may be moved about the mirror shaft by the motor. Here, the camera may further include a joint configured to connect the one side end of the mirror and the mirror shaft or connect the other side end of the mirror and the motor, wherein the mirror may be moved about the joint as a rotating shaft.

The mirror may include a first mirror configured to reflect the light transmitted via the lens, and a second mirror configured to reflect the light reflected from the first mirror and transmit the light to the sensor, wherein the first mirror and the second mirror may be moved.

The camera may further include an elastic member configured to prevent the mirror from shaking or escaping from a rotating shaft. The camera may further include a motor configured to move the mirror to adjust the focus on the object.

Another aspect of the present invention provides a camera including a lens fixedly installed and configured to collect and transmit light received from a moving object, and a sensor including one side end fixed by a sensor shaft and the other side end configured to move about the fixed one side end such that an optical distance between the sensor and the lens is adjusted according to the object to adjust a focus on the object, and configured to convert the light transmitted via the lens into an image signal. The camera may further include a motor configured to move the sensor to adjust a focus onto the object.

Still another aspect of the present invention provides an object processing apparatus including a camera configured to adjust an optical distance between a lens and a sensor by moving a mirror or moving one side end of a sensor without a mirror to adjust a focus onto a moving object and photograph the object, a motor located in the camera and configured to move the mirror or sensor to adjust the focus on the object, a measuring unit configured to measure a size including a height or volume of the object, and a controller configured to drive the motor on the basis of the size of the object measured by the measuring unit.

Here, the camera may adjust the optical distance between the lens and the sensor by moving the mirror installed to be moveable between the lens and the sensor, which are fixedly installed, to adjust the focus on the object. Alternatively, the camera may adjust the optical distance between the sensor and the lens using the sensor including the one side end fixed by a sensor shaft and the other side end configured to move about the fixed one side end without a mirror to adjust the focus on the object.

The controller may calculate a movement value by which the mirror is moved between the lens and the sensor which are fixedly installed, or a movement value by which the sensor is moved toward the fixedly installed lens without a mirror from the size of the object measured by the measuring unit according to a distance between a surface of the object photographed and the camera, and may transmit a control signal to the motor according a result of the calculation to move the mirror or sensor.

The camera may acquire a barcode or address information of the object as an image.

The object processing apparatus may further include an identifying unit configured to read identification information or address information of the object expressed as a barcode or text from an image captured by the camera.

The object processing apparatus may further include a communicating unit configured to transmit or receive data to or from a managing server configured to manage object information and object classification information, wherein the communicating unit may transmits the identification information or address information of the object acquired from the captured image via the identifying unit to the managing server, and may receive the object classification information acquired by the managing server searching for the identification or address information of the object from the managing server, and the controller may classify the object using the received object classification information.

Advantageous Effects

According to the present invention, a camera according to one embodiment can correspond to a speed of a rapidly moving object and rapidly adjust its focus on the object. In addition, to adjust the focus, an entirety of a sensor is not moved and a mirror is moved while the sensor is fixed or only one side end of the sensor is moved. Therefore, a focus adjusting method is easy and simple in comparison to when the entirety of the sensor is moved. A method in which one side end of the mirror or the sensor is fixed and only the other side thereof is moved eases adjustment of a distance between central portions of the lens and the sensor, particularly in a line scan camera.

In addition, the above-described focus adjustment technology can be applied to an object classification technology and can automatically classify an object. In this case, an operation time can be reduced while accuracy is improved, productivity can be increased, and a structure of an apparatus can be simplified such that an installation space is decreased.

MODES OF THE INVENTION

Hereinafter, the embodiments of the present invention will be described in detail with reference to the accompanying drawings. In the description of the invention, when it is determined that detailed descriptions of related well-known functions unnecessarily obscure the gist of the invention, the detailed descriptions will be omitted. In addition, some terms described below are defined in consideration of functions in the invention, and meanings thereof may vary depending on, for example, a user or operator's intentions or customs. Therefore, the meanings of terms should be interpreted on the basis of the scope throughout this specification.

Figure 1:
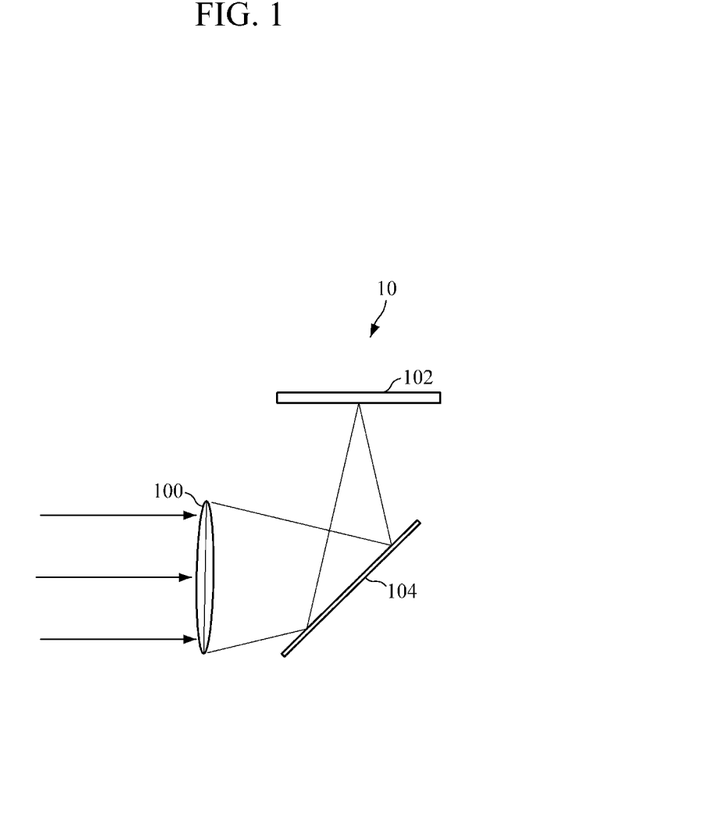
FIG. 1 is a configuration diagram illustrating a camera configured to adjust a focus using a mirror according to one embodiment of the present invention.

FIG. 1 is a configuration diagram illustrating a camera configured to adjust a focus using a mirror according to one embodiment of the present invention.

Referring to FIG. 1, a camera 10 includes a lens 100, a sensor 102, and a mirror 104.

The camera 10 photographs an object to acquire an image thereof. The object is a moving object, for example, an object moving on a moving base such as a conveyer belt. In a case in which the camera 10 is located at a fixed location, the camera 10 photographs objects which move on the moving base. The objects may be rapidly moving objects, for example, objects moving at a speed of 1 to 4 m per second. In addition, sizes such as heights or volumes of the objects may be different. In this case, distances from surfaces of the objects to be photographed to the camera 10 are different for each of the objects. Accordingly, the camera 10 rapidly adjusts its focus corresponding to the distances from the objects to the camera 10 according to the heights or volumes of the objects when photographing the objects having different heights or volumes. A surface to be photographed by the camera 10 may be an upper surface, a left surface, a right surface, a front surface, or a rear surface of the object.

The lens 100 included in the camera 10 collects light incident from the object and transmits the light to the mirror. The sensor 102 converts the light received via the lens 100 into an image signal to acquire an image. The mirror 104 is located between the lens 100 and the sensor 102, reflects the light transmitted from the lens 100, and transmits the light to the sensor 102. Here, the mirror 104 being located between the lens 100 and the sensor 102 means that the mirror 104 is located on an optical path between the lens 100 and the sensor 102 through which light physically passes.

In the camera 10 according to one embodiment, the lens 100 and the sensor 102 are installed at fixed locations, and the mirror 104 is installed to be movable between the lens 100 and the sensor 102 such that an optical distance from the lens 100 to the sensor 102 is increased or decreased. The mirror 104 is moved to increase or decrease the optical distance from the lens 100 to the sensor 102 so as to adjust a focus of the camera 10 by corresponding the optical distance to a distance from the camera 10 to a surface of the object to be photographed, wherein the distance is changed according a height or volume of the object.

Specifically, since the lens 100 is heavy, when the focus is adjusted by rotating the lens 100, a physical defect such as wear may occur, and particularly, such rotation is not suitable when rapidly adjusting the focus. In a case of the sensor 102, since a cable for transmitting a signal is connected to the sensor 102, it is not easy to move the sensor 102 to adjust the focus. Accordingly, in the camera 10 according to one embodiment, the focus of the camera 10 is easily adjusted by fixing the lens 100 and the sensor 102 and moving the mirror 104 installed to be movable between the lens 100 and the sensor 102. Particularly, the camera 10 adequately adjusts its focus on a rapidly moving object.

The camera 10 according to one embodiment is a line scan camera. Although the line scan camera may be a contact type line scan camera or a non-contact type line scan camera such as a long or short distance scanner, the camera 10 is the non-contact type line scan camera. The sensor 102 of the line scan camera is a line sensor having a long line-shaped sensing area. The line scan camera linearly scans an object using the line sensor.

In a case in which the area scan camera uses a two or more dimensional area sensor, a location of the sensor also has to be changed to adjust the focus. For example, the sensor has to be inclined at a predetermined angle together with the mirror. In this case, an upper or lower area of a sensing area except the sensing area of a center of the sensor is out of focus. However, in the case of the line sensor having a longitudinal or transverse long line shape, since only the sensing area having a line shape is meaningful, adjusting a focus on an area which is not the sensing area is not necessary. Accordingly, it is preferable for the camera 10 to be the line scan camera to adjust a focus using movement of the mirror 104. However, when a plurality of mirrors are used in the camera 10, the camera may be an area scan camera as well as a line scan camera, and an example related to a camera using an area scan camera will be described below with reference to FIG. 4.

Figure 2:
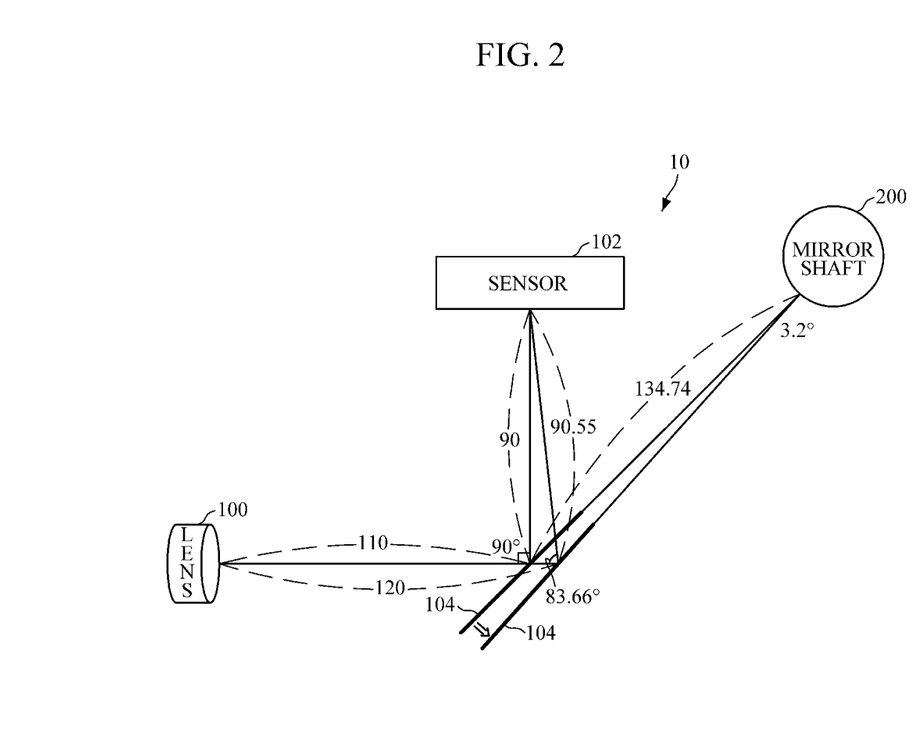
FIG. 2 is a reference view illustrating an example in which a focus of the camera is adjusted by moving the mirror according to one embodiment of the present invention.

FIG. 2 is a reference view illustrating an example in which a focus of the camera is adjusted by moving the mirror according to one embodiment of the present invention mirror.

Referring to FIG. 2, in a state in which one side end of the mirror 104 is fixed by a mirror shaft 200, the camera 10 adjusts its focus by moving the other side end of the mirror 104 about the mirror shaft 200. Both of the side ends of the mirror 104 include extension lines. For example, as illustrated in FIG. 2, the one side end of the mirror 104 is a point at which the extension line of the mirror 104 meets the mirror shaft 200. A location of the mirror shaft 200 may be a point at which a location of an object varies minimally when the mirror 104 is assumed to be moved from both of the side ends of the mirror 104.

The mirror 104 according to one embodiment adjusts the focus of the camera 10 by adjusting the optical distance from the lens 100 to the sensor 102. For example, when upper surfaces of objects are photographed, the mirror 104 adjusts the focus according to heights of the objects. Here, in a case in which a height of an object is increased, the sensor 102 may be moved backward to adjust the focus, but, since the sensor 102 is fixed, the mirror 104 is moved backward to increase the optical distance and adjust the focus. Conversely, in a case in which a height of an object is decreased, the mirror 104 is moved forward to decrease the optical distance and adjust the focus.

For example, as illustrated in FIG. 2, when the focus is adjusted on a predetermined object, it is assumed that an optical distance from the sensor 102 to the mirror 104 is 110, and the optical distance from the mirror 104 to the sensor 102 is 90. When, after the focus is adjusted and the object is photographed, a subsequent object is photographed and a height of the object is higher than that of the previous object, the mirror 104 is moved backward such that an optical distance from the lens 100 to mirror 104 and the optical distance from mirror 104 to the sensor 102 are increased to be 120 and 90.55, respectively, and thus a focus is adjusted. Here, an angle between the lens 100 and the sensor 102 is decreased from 90° to 83.66°. However, since the example described with reference to FIG. 2 is an example for facilitating understanding of the present invention, the present invention is not limited thereto.

Figure 3:
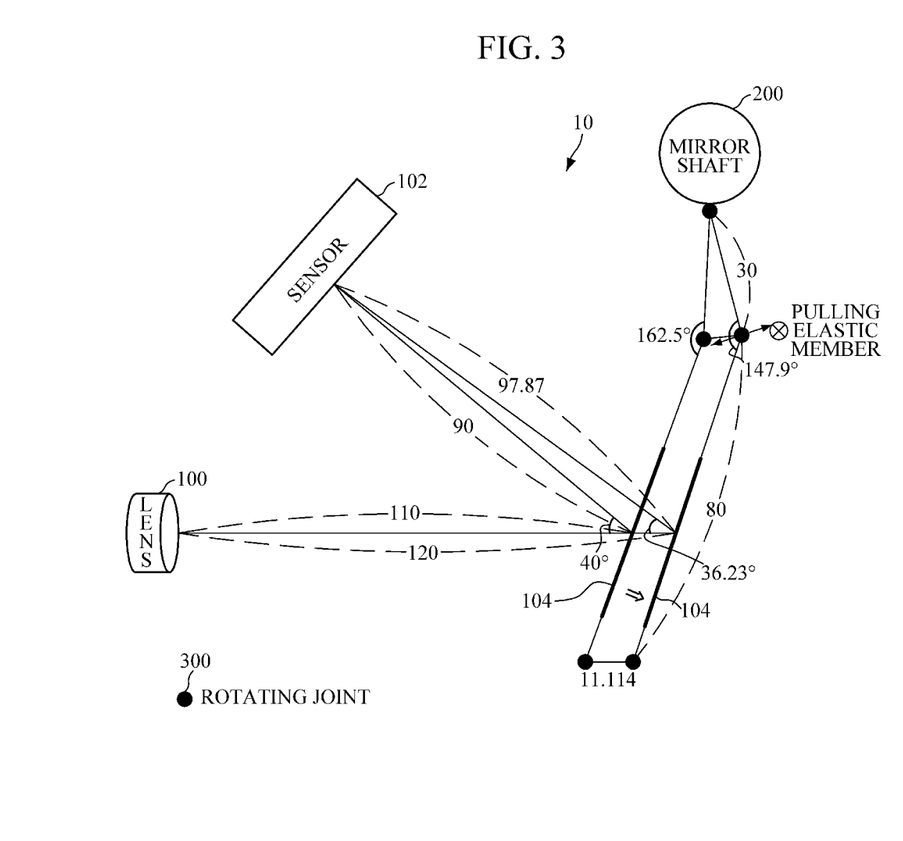
FIG. 3 is a reference view illustrating an example in which a focus of the camera is adjusted using a joint in a case in which a mirror shaft according to one embodiment of the present invention is located far away from the mirror.

FIG. 3 is a reference view illustrating an example in which a focus of the camera is adjusted using a joint in a case in which a mirror shaft according to one embodiment of the present invention is located far away from the mirror.

Figure 5:
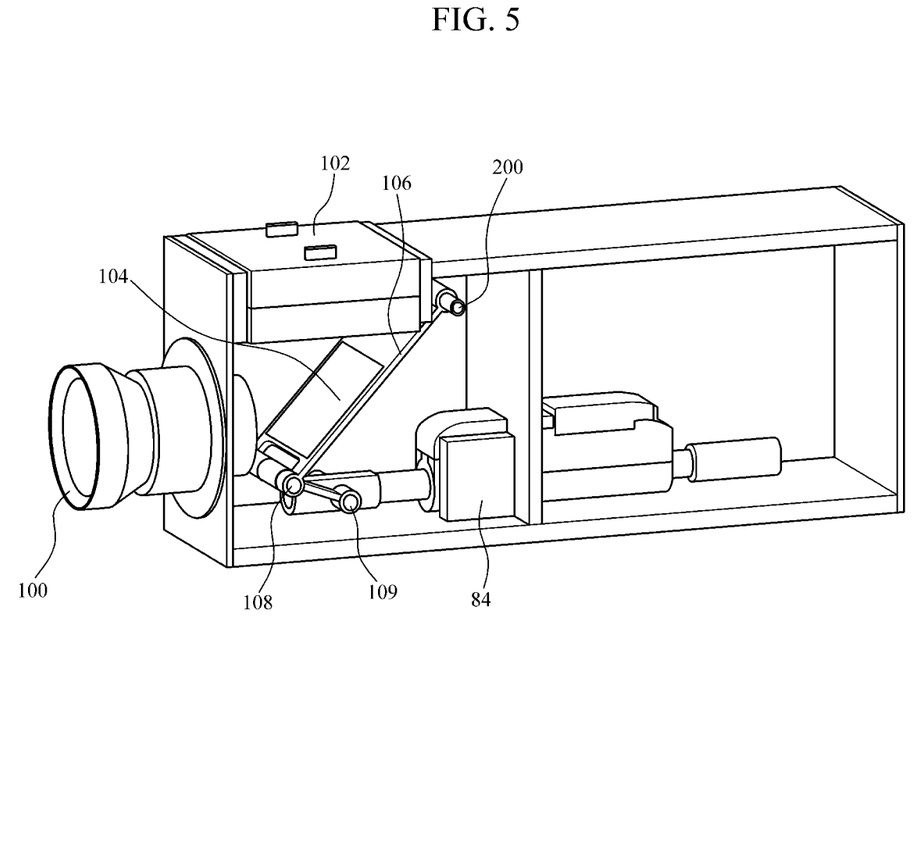
FIG. 5 is an exterior view illustrating the camera of FIG. 1 according to one embodiment of the present invention.

Referring to FIG. 3, in a case in which the mirror shaft 200 is located far away from the mirror, a joint 300 is used. For example, as illustrated in FIG. 3, the joint 300 may be located between the mirror shaft 200 and the one side end of the mirror 104, or between the other side end of the mirror 104 and a motor configured to move the mirror 104. An upper portion of the mirror 104 is rotated about the joint 300 and the lower portion of the mirror 104 is connected to the motor and linearly moved transversely. As illustrated in FIG. 2, in a case in which only one joint is used above the mirror 104, a joint 108 may be additionally included below the mirror 104 such that the motor is linearly moveable as illustrated in FIG. 5.

The camera 10 according to one embodiment includes an elastic member configured to prevent the mirror 104 from shaking or escaping from a rotating shaft. The elastic member has a restoring force like, for example, a spring. For example, when the elastic member is provided between the lens 100 and the mirror 104 and the mirror 104 is constantly pulled toward or away from the lens 100, an error due to the mirror 104 being shaken or escaping from the rotating shaft may be prevented. The elastic member prevents the mirror 104 from shaking or escaping from the rotating shaft by pulling or pushing the mirror 104 in any one direction. Therefore, control accuracy of a focal distance of the camera 10 can be improved.

Meanwhile, since a principle of adjusting the focus of the camera 10 with reference to FIG. 3 is the same as the principle of adjusting the focus by adjusting the optical distance between the lens 100 and the sensor 102 using the mirror 104 described above with reference to FIG. 2, a detailed description of the principle with reference to FIG. 3 will be omitted.

Figure 4:
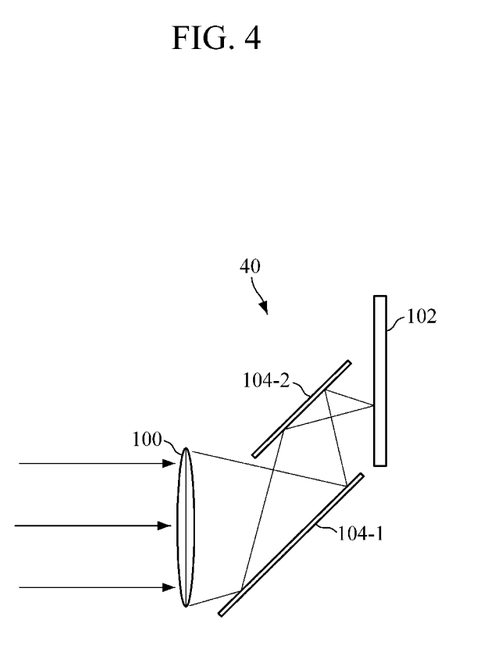
FIG. 4 is a configuration diagram illustrating a camera configured to adjust a focus using a plurality of mirrors according to one embodiment of the present invention.

FIG. 4 is a configuration diagram illustrating a camera configured to adjust a focus using a plurality of mirrors according to one embodiment of the present invention.

Referring to FIG. 4, a plurality of moving mirrors may be provided. For example, the moving mirrors may include two mirrors, which are a first mirror 104-1 and a second mirror 104-2, as illustrated in FIG. 4. The first mirror 104-1 reflects light transmitted via the lens 100. In addition, the second mirror 104-2 reflects the light reflected by the first mirror 104-1 and transmits the light to the sensor 102. Here, the first mirror 104-1 and the second mirror 104-2 move to adjust a focus of a camera 40. The first mirror 104-1 and the second mirror 104-2 may be moved simultaneously.

When the plurality of mirrors are used, the camera 40 may also adjust its focus in the case in which the camera is an area scan camera using an area sensor as well as the case in which the camera is a line scan camera using a line sensor. For example, as illustrated in FIG. 4, when light is reflected by the first mirror 104-1 and reaches the second mirror 104-2, the second mirror 104-2 transmits the light to the sensor 102, unlike the first mirror 104-1. When the second mirror 104-2 is used, since light is perpendicularly (90° incident on the sensor 102, the area scan camera as well as the line scan camera can also be used.

FIG. 5 is an exterior view illustrating the camera of FIG. 1 according to one embodiment of the present invention.

Referring to FIG. 5, the camera 10 includes the lens 100, the sensor 102, and the mirror 104, and the mirror 104 is supported by a mirror support 106 and has an extension line. One side end of the mirror 104 is fixed by the mirror shaft 200, and an opposite side end of the mirror 104 is connected to the motor 84. As illustrated in FIG. 5, the motor 84 may be a linear motor configured to linearly move forward and backward. When the motor 84 is driven, the opposite side end of the mirror 104 is moved about the mirror shaft 200. In a case in which the mirror shaft 200 is located at a location far away from the motor 84, a joint configured to connect the one side end of the mirror and the mirror shaft or connect the other side end of the mirror and the motor 84 may be provided. For example, as illustrated in FIG. 5, joints 108 and 109 may be provided between the mirror support 106 and the motor 84. Here, the joints 108 and 109 connect the mirror shaft 200 above a surface of the mirror 104 and linear movement of the motor 84 connected to a lower portion of the surface of the mirror 104.

The camera according to one embodiment includes an elastic member configured to prevent the mirror 104 from shaking or escaping from the rotating shaft. When the elastic member having a restoring force like a spring is connected to one surface of the mirror 104 and installed such that the mirror 104 is pulled toward or away from the lens 100 by the elastic member, the mirror 104 may be prevented from being shaken. The elastic member may prevent the mirror 104 from being shaken by pulling or pushing the mirror 104 in any one direction. Therefore, accuracy of the camera can be improved.

Figure 6:
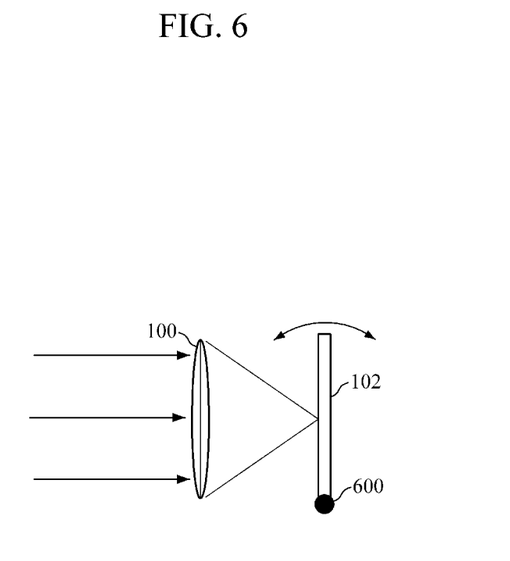
FIG. 6 is a configuration diagram illustrating a camera according to another embodiment of the present invention.

FIG. 6 is a configuration diagram illustrating a camera according to another embodiment of the present invention.

Referring to FIG. 6, a focus of a camera 60 may be adjusted without using the mirror described with reference to FIG. 1. One side end of a sensor 102, for example, a lower side end thereof, is fixed by a sensor shaft 600, as illustrated in FIG. 6, and the opposite side end of the sensor 102 is moved about the sensor shaft 600 to adjust the focus of the camera 60. In this case, the focus may be easily adjusted in comparison to when an entirety of the sensor 102 is moved to adjust the focus. In addition, a total volume of the camera 60 can be reduced.

Figure 7:
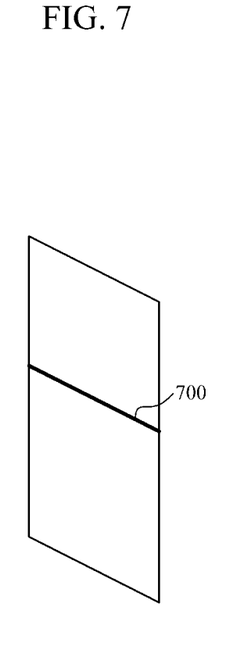
FIG. 7 is a reference view for describing a principle in which the focus of the camera is adjustable by moving one side end of a sensor according to one embodiment of the present invention.

FIG. 7 is a reference view for describing a principle in which the focus of the camera is adjustable by moving one side end of the sensor according to one embodiment of the present invention.

Referring to FIGS. 6 and 7, when a sensing area of the sensor 102 in FIG. 6 is a two-dimensional area, the sensing area is an area corresponding to reference number 700, and the remaining area is not the sensing area. Even when one side of the sensor 102 is inclined about the sensor shaft 600 to adjust a focus, the sensing area 700 is located such that an optical distance between the lens 100 and the sensor 102 is the same. Even when the focus is not adjusted onto the area which is not the sensing area 700 because the optical distance between the lens 100 and the sensor 102 is different from that of at the sensing area 700, there is no problem in adjusting the focus onto the sensing area 700.

Figure 8:
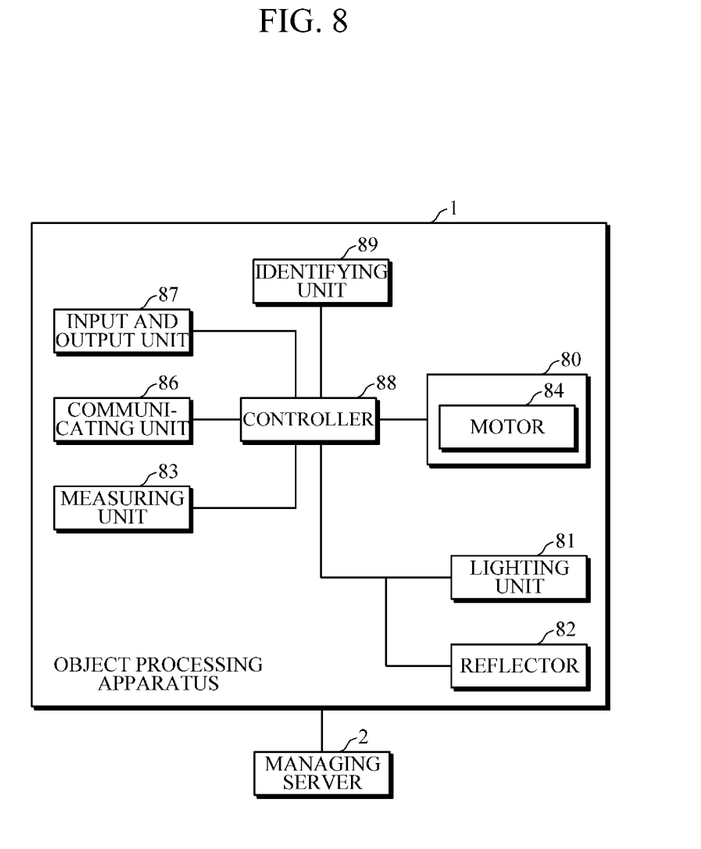
FIG. 8 is a configuration diagram illustrating an object processing system according to one embodiment of the present invention.

FIG. 8 is a configuration diagram illustrating an object processing system according to one embodiment of the present invention.

A technology of adjusting a focus of the camera described above with reference to FIGS. 1 to 7 may be applied to the object processing system of FIG. 8. Here, a process includes registration, reception, classification, storage, testing, and the like of an object. Hereinafter, an object classification technology will be mainly described, but object processing is not limited to the object classification. The object may be an object to be tested or a piece of mail such as a parcel to be transported. Hereinafter, a case in which the object is a piece of mail will be mainly described, but the kind of object is not limited to being a piece of mail.

To facilitate understanding of the present invention, a mail classification system of the object processing system will be described below. First, when a piece of mail is received, a barcode, in which mail identification information (ID) is recorded, is printed on or attached to the piece of mail. The mail ID is a code including a series of numbers, such as an invoice number and a receipt number, uniquely assigned to the piece of mail for mail management when the piece of mail is received. The mail ID of the barcode may be stored in a managing server 2 and used as an identifier for tracing or referring to the piece of mail. In addition, sender information and recipient information received from the sender when the piece of mail is received are matched with object ID and stored in the managing server 2. The sender information and the recipient information include names, addresses, and zip codes.

Then, the object processing system automatically classifies pieces of registered mail according to recipients by moving the pieces of mail on conveyer belts. For example, the barcode of the mail or address information is acquired as an image via a camera 80, and a piece of mail is automatically classified using acquired image data. The automatically classified piece of mail is transported to a corresponding recipient via a courier.

A process of automatically classifying a piece of mail using a barcode image will be described in more detail below. An object processing apparatus 1 reads ID of a piece of mail included in a photographed barcode image and transfers the read ID of the piece of mail to the managing server 2. The managing server 2 searches for address information of pieces of mail having the mail ID. The address information is information matched with the mail ID and stored in the managing server 2 in advance when the piece of mail is received, and includes a recipient address, a zip code, and the like. Since the managing server 2 stores mail classification information, for example, the recipient address, with which the piece of mail may be classified, the managing server 2 searches for the mail classification information matched with the recipient address and transfers the recipient address to the object processing apparatus 1. The object processing apparatus 1 receives the mail classification information and automatically classifies the piece of mail according to the mail classification information. For example, a piece of mail to be transported to Gwangju is classified and sent to mail box number 1, and a piece of mail to be transported to Daejeon is classified and sent to a mail box number 2. Then, the classified pieces of mail are transported to corresponding regions via couriers.

Meanwhile, in a case in which the object processing apparatus 1 automatically classifies a piece of mail using a recipient address captured by the camera 80, a mail identification process performed when using a barcode is omitted. For example, the object processing apparatus 1 transfers a recipient address photographed by the camera 80 to the managing server 2. The managing server 2 searches for mail classification information matched with the recipient address and transfers the mail classification information to the object processing apparatus 1. The object processing apparatus 1 receives the mail classification information and automatically classifies mail according to the mail classification information.

Hereinafter, a structure of the object processing apparatus 1 will be described in detail with reference to FIG. 8. Referring to FIG. 8, the object processing apparatus 1 may include the camera 80, a lighting unit 81, a reflector 82, a measuring unit 83, a communicating unit 86, an input and output unit 87, a controller 88, and an identifying unit 89, and the camera 80 may further include a motor 84.

Moving objects have different sizes such as heights and volumes. Accordingly, it is necessary to adjust a focus of the camera 80 according to a size of an object. Particularly, since the objects move quickly, the camera 80 has to quickly adjust its focus to correspond to objects. To adjust the focus, the camera 80 according to one embodiment has the structure described above with reference to FIG. 1. That is, the camera 80 includes the lens, the sensor, the mirror, and the motor 84, the mirror is moved between the fixed lens and the fixed sensor to adjust an optical distance between the lens and the sensor and adjust its focus on an object. Here, the one side end of the mirror is fixed by the mirror shaft and the other side end of the mirror is connected to the motor 84, and thus the other side end of the mirror may be moved about the mirror shaft by the motor 84 being driven. A camera 80 according to another embodiment has the structure described above with reference to FIG. 6. That is, the camera 80 includes the lens, the sensor, and the motor 84 without a mirror and adjusts its focus on an object by the other side end of the sensor being moved about the one side end thereof to adjust an optical distance between the lens and the sensor. Here, the movement of the sensor may be performed by the motor 84 being driven.

The lighting unit 81 emits light to an object using lighting. The reflector 82 reflects the light emitted from the lighting unit 81 to the object. The lighting unit 81 may include a light emitting element such as a light emitting diode (LED) or a light bulb. The camera 80 receives light reflected by the object and photoelectrically converts the light to acquire an image of the object. There may be one or a plurality of cameras 80. In the case of a plurality of cameras, images of an object may be acquired at different locations.

The measuring unit 83 measures a size, such as a height or volume, of the object before the camera 80 photographs the object. The measuring unit 83 may measure the size of the object via various methods, and for example, the measuring unit 83 may be a contact type sensor configured to acquire size information by coming into contact with the object. Alternatively, the measuring unit 83 may be an optical displacement sensor configured to acquire size information of a corresponding object by emitting an optical signal to the object and using a signal reflected from the object. As another example, the measuring unit 83 may also be an image sensor configured to acquire size information by acquiring an image of an object and using the acquired image. As necessary, the measuring unit 83 may measure a weight of an object as well as the size of the object.

The controller 88 controls an entirety of the object processing apparatus 1. The controller 88 processes an image captured by the camera 80 and performs a physical control of the components. The controller 88 controls the input and output unit 87 through which a result of object processing may be output, and various matters may be set and commands may be input by a processor.

The controller 88 according to one embodiment drives the motor 84. To adjust the focus, the mirror is moved by the motor 84 when the mirror is used, or the sensor is moved by the motor 84 when the sensor is used.

The controller 88 according to one embodiment calculates a movement value by which the mirror is moved between the fixed lens and the fixed sensor according to information of a distance between a surface of an object to be photographed and the camera calculated using a size of the object measured by the measuring unit 83, and transfers a control signal for moving the mirror to the motor 84 according to the result of the calculation. As another example, in a case in which one side end of the sensor is moved without a mirror, the controller 88 calculates a movement value by which the sensor is moved according to information of a distance between a surface of an object to be photographed and the camera calculated using a size of the object measured by the measuring unit 83, and transfers a control signal for moving the sensor to the motor 84 according to the result of the calculation. A function for controlling the motor 84 to adjust the focus or a control function for acquiring an image may be included in the camera 80 or be included in another controller outside the camera 80.

The identifying unit 89 reads ID or address information of the object expressed as a barcode or text from an image captured by the camera 80.

The communicating unit 86 allows data including the image captured by the camera 80, an identification result read by the identifying unit 89, object information and object classification information stored in the managing server 2, and the like to be transmitted and received among the controller 88, the managing server 2, and the like. The communicating unit 86 according to one embodiment transfers the image captured by the camera 80 to the identifying unit 89. The communicating unit 86 according to one embodiment transmits the ID or address information of the object acquired by the identifying unit 89 to the managing server 2 and acquires the object classification information from the managing server 2. Specifically, the communicating unit 86 transfers the ID or the address information of the object to the managing server 2. The managing server 2 searches for mail classification information matched with the address information. In a case in which the managing server 2 receives the ID of the object, the managing server 2 searches for address information matched with the ID of the object and searches for mail classification information matched with the address information. In addition, the managing server 2 transfers the found mail classification information to the object processing apparatus 1. Then, the communicating unit 86 receives the mail classification information form the managing server 2, and the controller 88 classifies the object according to the acquired mail classification information.

Figure 9:
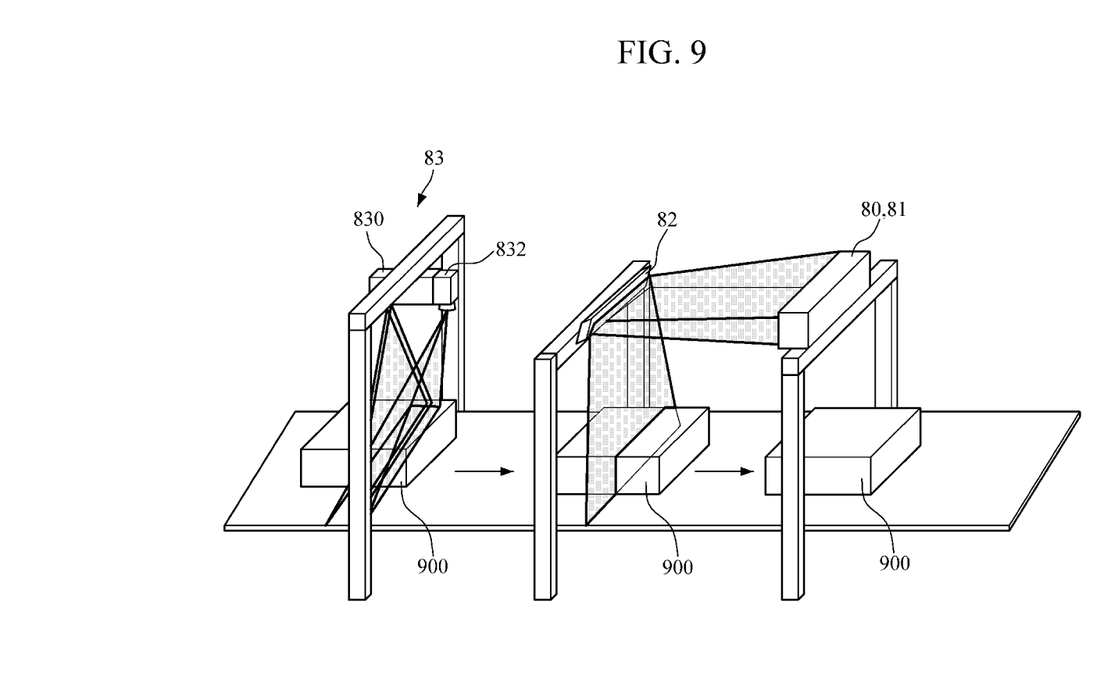
FIG. 9 is an exterior view illustrating the object processing apparatus according to one embodiment of the present invention.

FIG. 9 is an exterior view illustrating the object processing apparatus according to one embodiment of the present invention, Referring to FIGS. 8 and 9, the measuring unit 83, the reflector 82, the camera 80, and the lighting unit 81 are sequentially installed on a moving base such as a conveyer belt, and objects 900 are rapidly moved between the measuring unit 83, the reflector 82, the camera 80, and the lighting unit 81 along a line. For example, as illustrated in FIG. 9, the object 900 is moved toward the right. The camera 80 and the lighting unit 81 may be located at the same location, as illustrated in FIG. 9. The camera 80 may include the lens, the sensor, and the mirror. Alternatively, the camera 80 may include the lens and the sensor without a mirror. The camera 80 may further include the motor configured to move the mirror or the sensor. The camera may also be installed in a transvers direction to photograph a side surface, a front surface, or a rear surface of the object 900.

When the moving object 900 is positioned within a measurement coverage of the measuring unit 83, the measuring unit 83 measures a size including a height or volume of the object 900. As illustrated in FIG. 9, the measuring unit 83 according to one embodiment includes a light source 830 configured to emit light such as a laser to the object 900, and a measurement camera unit 832 configured to receive a signal reflected by the object 900, convert the signal into an image, and measure the size of the object from the image. As necessary, the measuring unit 83 may also measure a weight of the object in addition to the size thereof. While the size of the object is measured, the object 900 is continuously moved, and a focus is adjusted on the object 900 having its size measured using the camera 80 to acquire an image such as a barcode or recipient information of the object 900. The acquired image is used to classify the object 900.

Figure 10:
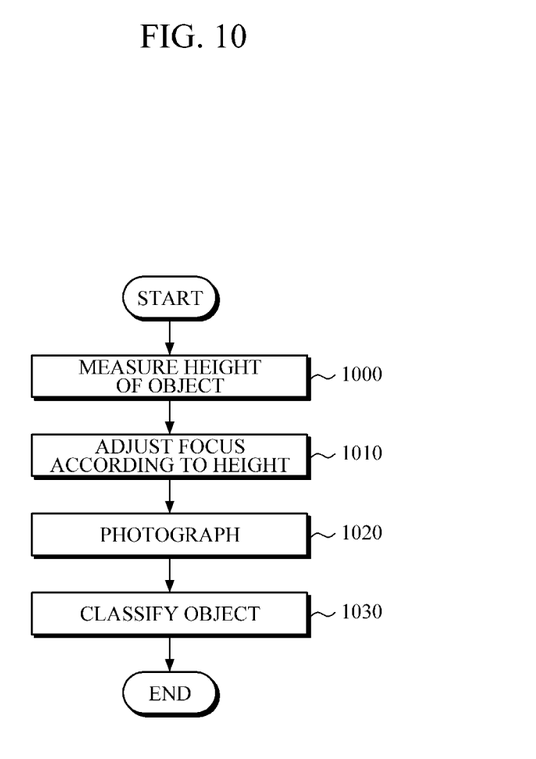
FIG. 10 is a flowchart illustrating an object processing method according to one embodiment of the present invention.

FIG. 10 is a flowchart illustrating an object processing method according to one embodiment of the present invention.

Referring to FIG. 10, an object processing apparatus measures a size including a height or volume of an object (1000). In addition, a camera adjusts a focus on the object using the measured size of the object and photographs the object (1010 and 1020). To adjust the focus, the camera adjusts an optical distance between a lens and a sensor. As one example, the optical distance is adjusted by a mirror being moved between the lens and the sensor which are fixedly installed to adjust the focus. As another example, the optical distance is adjusted by one side of the sensor being moved between the lens and the sensor without a mirror to adjust the focus. Then, objects are photographed (1020) and classified (1030) using image data acquired thereby.

While the present invention has been particularly shown and described with reference to exemplary embodiments thereof, it should be understood by those skilled in the art that various changes in form and details may be made therein without departing from the spirit and scope of embodiments as defined by the appended claims. The exemplary embodiments should be considered in a descriptive sense only and not for purposes of limitation. Therefore, the scope of embodiments is defined not by the detailed description of embodiments but by the appended claims, and all differences within the scope should be construed as being included in the present invention.

The invention claimed is:

1. A camera comprising:
   a lens configured to collect and transmit light received from a moving object;
   a mirror configured to reflect the light transmitted from the lens; and
   a sensor configured to receive the light reflected from the mirror and convert the light into an image signal,
   wherein an optical distance between the lens and the sensor, which are fixedly installed in the camera, is adjusted by the mirror, which is installed to be movable, being moved between the lens and the sensor, and a focus is adjusted,
   wherein the mirror comprises one side end fixed by a mirror shaft and the other side end connected to a motor, and the other side end of the mirror is moved about the mirror shaft by the motor.

2. The camera of claim 1, wherein:
   the sensor includes a line sensor having a line-shaped sensing area; and
   the camera includes a line scan camera.

3. The camera of claim 1, wherein, when objects having different heights or volumes are photographed, the mirror is moved to increase or decrease the optical distance between the lens and the sensor to adjust the focus onto the object according to a distance between the object and the camera.

4. The camera of claim 1, further comprising a joint configured to connect the one side end of the mirror and the mirror shaft or connect the other side end of the mirror and the motor,
   wherein the mirror moves about the joint as a rotating shaft.

5. The camera of claim 1, wherein the mirror includes:
   a first mirror configured to reflect the light transmitted via the lens; and
   a second mirror configured to reflect the light reflected from the first mirror and transmit the light to the sensor,
   wherein the first mirror and the second mirror are moved.

6. The camera of claim 1, further comprising an elastic member configured to prevent the mirror from shaking or escaping from a rotating shaft.

7. The camera of claim 1, further comprising a motor configured to move the mirror to adjust the focus on the object.

* * * * *